United States Patent

[11] 3,627,407

| [72] | Inventors | Gerald H. Cook<br>Lynnfield;<br>Rogers B. Downey, Lexington, both of Mass. |
|---|---|---|
| [21] | Appl. No. | 838,822 |
| [22] | Filed | July 3, 1969 |
| [45] | Patented | Dec. 14, 1971 |
| [73] | Assignee | Polaroid Corporation<br>Cambridge, Mass. |

[54] MOTION PICTURE FILM PRESSURE PLATE ASSEMBLY
11 Claims, 8 Drawing Figs.

[52] U.S. Cl. .................................................. 352/221, 352/78 R, 352/130
[51] Int. Cl. ..................................................... G03b 1/48
[50] Field of Search............................................ 352/72, 78, 221 T, 104

[56] References Cited
UNITED STATES PATENTS

| 2,238,719 | 4/1941 | Tartas .......................... | 352/72 |
|---|---|---|---|
| 2,431,681 | 12/1947 | Barstow ........................ | 352/229 |
| 2,526,647 | 10/1950 | Foster et al. ................... | 352/224 X |
| 3,136,209 | 6/1964 | Briskin et al. .................. | 352/224 X |
| 3,281,199 | 10/1966 | Kingston ....................... | 352/78 X |
| 3,466,123 | 9/1969 | Skuja............................ | 352/221 X |

FOREIGN PATENTS

| 1,086,353 | 10/1967 | Great Britain................ | 352/78 |

Primary Examiner—Louis R. Prince
Assistant Examiner—Joseph W. Roskos
Attorneys—Brown and Mikulka, W. D. Roberson and R. L. Berger ABSTRACT: An assembly formed of an integral piece of sheet metal comprising an elongated pressure plate, a leaf-type spring, a bracket for mounting a light-reflecting element in operative relationship to an aperture provided in the pressure plate and an arrangement for reflecting extraneous light rays in a direction away from the light-reflecting element. In a preferred embodiment, this assembly is incorporated into a unique motion-picture-film-handling cassette adapted to be first mounted in a camera to facilitate exposure operations and then in a processor-projector unit to facilitate film-processing and projection operations.

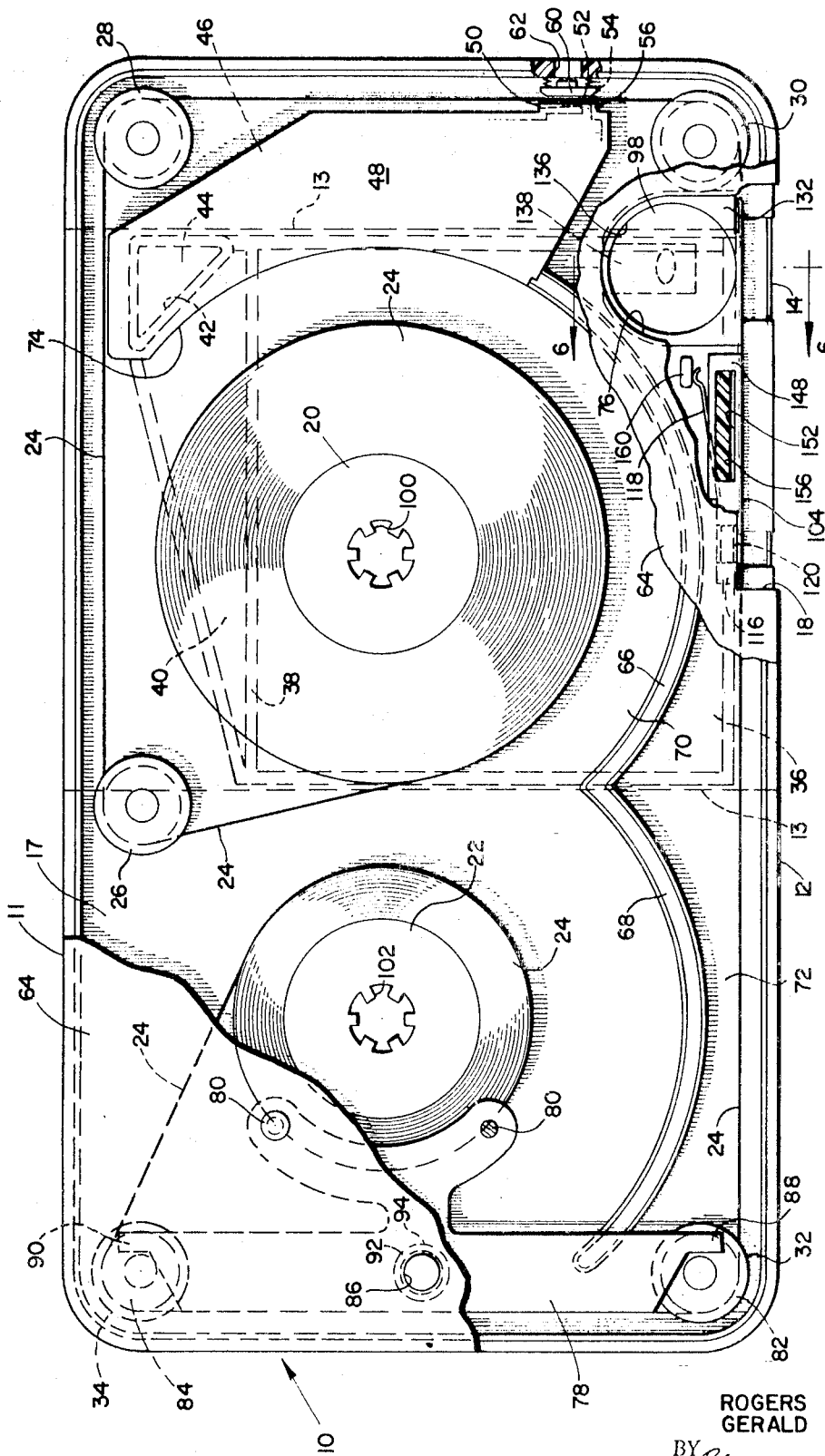
FIG. I
INVENTORS
ROGERS B. DOWNEY
GERALD H. COOK
BY Brown and Mikulka
and
Robert L. Berger
ATTORNEYS

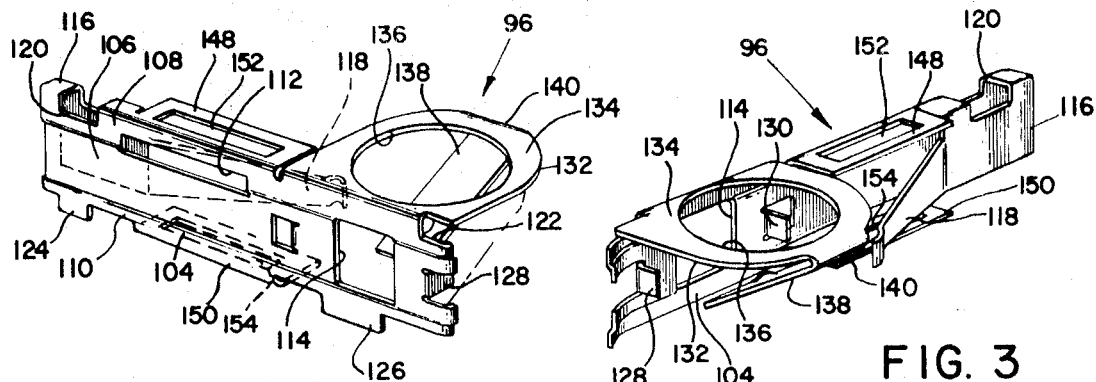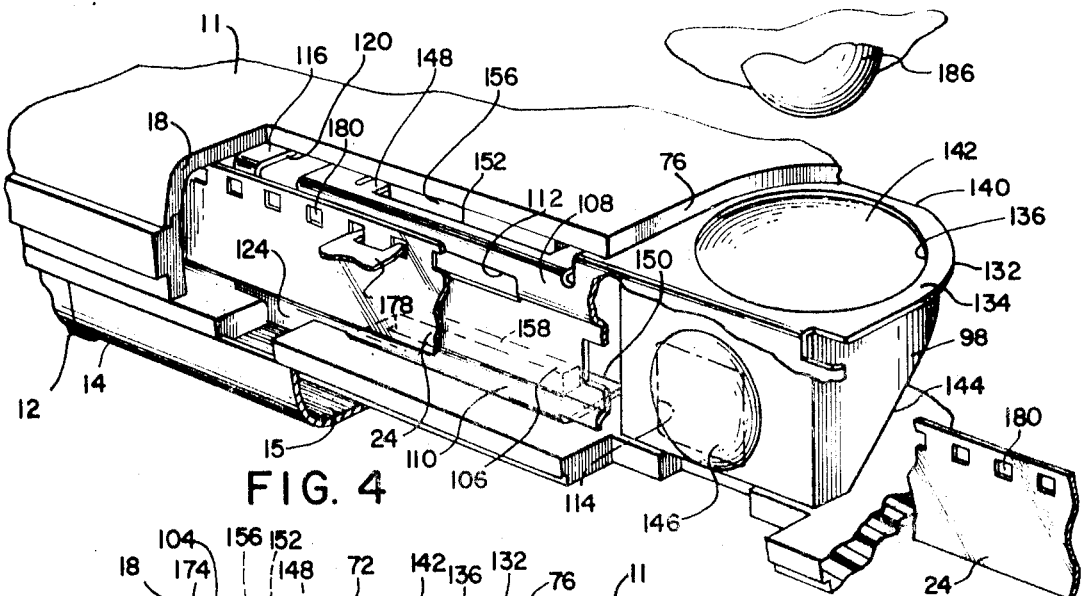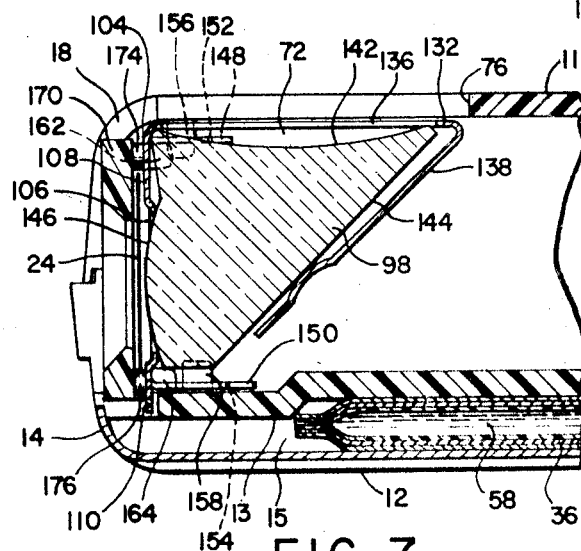

MOTION PICTURE FILM PRESSURE PLATE ASSEMBLY

BACKGROUND OF THE INVENTION

1. Field of the Invention

This invention relates to photography and, more particularly, to an improved device for facilitating first the exposure of a strip of photosensitive photographic material and then the projection of visible images recorded thereon after the exposed strip of photographic material has been processed.

2. Description of the Prior Art

After motion picture film has been exposed in a camera, it has generally been the practice for the photographer to sent the container of exposed film to a processing laboratory. At the laboratory the film is removed from the container and subjected to a series of operations in order to develop visible images from the images recorded thereon during the exposure operations. The fully developed filmstrip is then rewound onto a reel at the laboratory and returned to the user.

The extended delay normally incurred between the time exposed film is sent to the laboratory and returned ready for viewing has proved to be a significant inconvenience to the user and a source of great annoyance.

The field of still photography is no longer hampered by extensive periods of delay associated with the processing of exposed film. The impact on the public of the one-step photographic process employing diffusion transfer techniques is a matter of record and generally well known. The home still photographer can now enjoy the fruits of his efforts in a matter of seconds. This important convenience has been available to the amateur still photographer for many years.

Most recently, important technological advances have made it possible for the home photographer interested in motion pictures to enjoy this same convenience. Radically different systems have now been developed which permit the photographer himself to quickly and easily process and project motion picture film shortly after the pictures have been taken. Exemplary of such new and unique systems are those described in copending applications Ser. No. 755,901 of Edwin H. Land filed Aug. 28, 1968; Ser. No. 761,771 of Rogers B. Downey filed Sept. 23, 1968; Ser. No. 766,481 of Rogers B. Downey filed Nov. 18, 1968; Ser. No. 722,789 of Vaito K. Eloranta and Benjamin C. Ruggles filed Nov. 1, 1968; Ser. No. 788,897 of Rogers B. Downey filed Jan. 3, 1969; Ser. No. 813,427 of Rogers B. Downey filed Apr. 4, 1969; Ser. No. 813,469 of Rogers B. Downey filed Apr. 4, 1969; and Ser. No. 813,586 of Rogers B. Downey and Paul W. Thomas filed Apr. 4, 1969; all of which applications are assigned to the assignee of the present invention. Each of the systems described in the aforementioned copending applications most advantageously employ a cassette from which the film need not be removed during exposure, processing and projecting operations.

In commercial and industrial operations, such rapid motion-picture-processing systems are not only an improvement as a matter of convenience, but have other important effects as well. For instance, motion picture newsreel programs can be presented on television to the viewing public shortly after events of interest have occurred and been photographed.

Considerable funds and effort are currently being expended to further improve and refine various features of these systems. Obviously, in order for these new systems to enjoy widespread popularity, it is necessary that the cost of the cassettes employed therein be low, i.e. the cost to the consumer for exposing and processing a given length of a given type of film utilizing these multipurpose cassettes must be competitive with the cost of obtaining a similar strip of fully developed film employing other types of film-handling systems. This requirement for a low-cost cassette is an extremely critical consideration, the importance of which cannot be overemphasized.

It is desirable that cassettes of this general type include an internally mounted pressure plate and means for alternately resiliently urging that member into operable relationship with the aperture plates of a camera and a projector. Also many of these cassettes advantageously employ an internally mounted light-reflecting element, which may be prismatic in configuration, for redirecting light rays from the projector's light source outwardly from the cassette through the fully processed filmstrip and a film gate of the cassette. It is also important that only the useful light rays from the projector's light source be permitted to enter the cassette so as to come into contact with the cassette's light-reflecting element. Any extraneous light rays from the light source entering the cassette could result in an overheating condition within the interior of the cassette with deleterious effects on the various components housed therein.

The present invention is directed to an extremely simple low-cost device capable of effectively performing a plurality of necessary and/or desirable functions associated with the exposure and projection of motion picture film and which is particularly well suited for incorporation in compact multipurpose film-handling cassettes.

One of the objects of this invention, therefore, is to provide a motion-picture-film-handling cassette incorporating an improved pressure plate assembly.

Another primary object of this invention is to provide a motion-picture-film-handling cassette incorporating a low-cost device comprising a pressure plate and integrally formed spring means.

A further object of this invention is to provide a motion-picture-film-handling cassette incorporating a low-cost device comprising a pressure plate and mounting means for a light-reflecting element.

An additional object of this invention is to provide a motion-picture-film-handling cassette incorporating a device formed of an integral piece of sheet metal comprising a pressure plate, spring means and mounting means for a light-reflecting element.

Further, an object of this invention is to provide a motion-picture-film-handling cassette incorporating a low-cost device comprising an integrally formed pressure plate and light-reflecting element mounting means in combination with a light-reflecting element.

Still another object of this invention is to provide an improved film-handling cassette incorporating a device comprising a pressure plate and a light-reflecting element mounted thereon.

Also, an object of this invention is to provide an improved motion-picture-film-handling cassette incorporating a device for mounting a light-reflecting element and means formed integrally therewith for reflecting extraneous light rays outwardly of the cassette.

A still further object of this invention is to provide an improved pressure plate assembly for use with a strip of photographic material.

Additionally, a further object of this invention is to provide a low-cost device for use with a strip of photographic material comprising a pressure plate, spring means and mounting means for a light-reflecting element.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 1 is a diagrammatic cutaway plan view of a compact multipurpose motion-picture-film-handling cassette embodying features of this invention;

FIG. 2 is a diagrammatic front perspective view of the pressure plate assembly incorporated in the cassette of FIG. 1 and which embodies features of this invention;

FIG. 3 is a diagrammatic rear perspective view of the pressure plate assembly incorporated in the cassette of FIG. 1 and which embodies features of this invention;

FIG. 4 is a diagrammatic partially cutaway and partially sectioned perspective view of the pressure plate assembly incorporated in the cassette of FIG. 1, which view also illustrates the operative relationship between the light-reflecting element of the cassette and the light source of a projector;

FIG. 7 is a diagrammatic partial vertical sectional view similar to FIG. 6 except showing the operative relationship between the pressure plate assembly and the aperture plate of a camera when the cassette is mounted in a camera.

SUMMARY OF THE INVENTION

Figure 5:
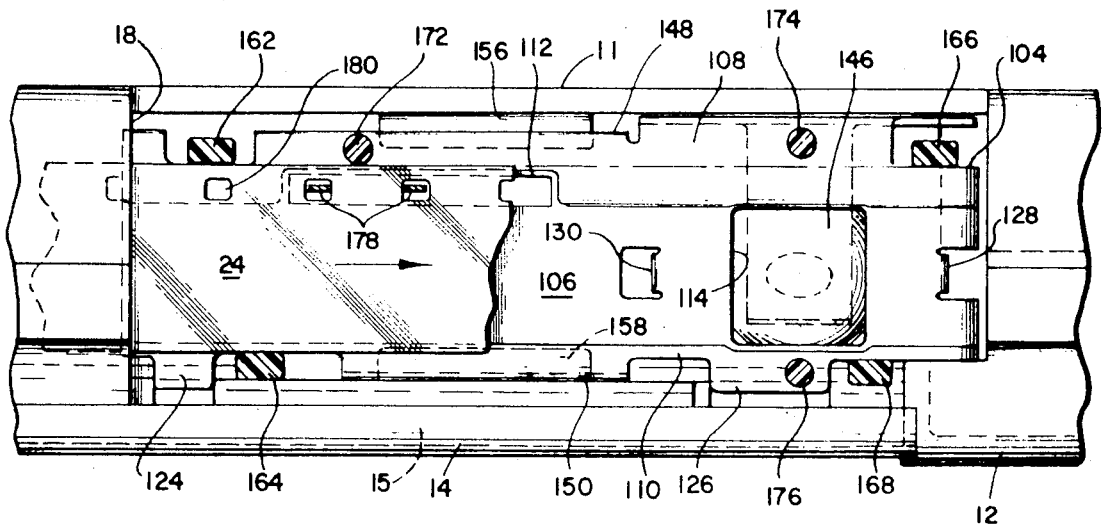
FIG. 5 is a diagrammatic partially cutaway, partial front elevation view illustrating the cassette of FIG. 1 with its pressure plate assembly and also illustrating the operative relationship of the pressure plate assembly and the aperture plates of a camera and projector.

A preferred embodiment of this invention briefly comprises a pressure plate assembly formed of an integral piece of sheet metal and which includes a pressure plate, a leaf spring and mounting means for a light-reflecting element. The pressure plate comprises a recessed portion extending the length thereof positioned intermediate a pair of raised edge portions. The mounting means are preferably configured to receive a light-reflecting element which is prismatic in nature, and are positioned so that the light-reflecting element is mounted in alignment with an aperture provided through the pressure plate. A portion of one of the mounting means seats against the face of the light-reflecting element adapted to receive light rays from an external light source and is provided with an aperture so that certain light rays from the light source are permitted to pass therethrough into contact with the light-reflecting element, while extraneous light rays from the light source are reflected thereby away from the light-reflecting element.

Most advantageously, this unique pressure plate assembly may be incorporated into a compact multipurpose motion-picture-film-handling cassette. The assembly is mounted in the cassette adjacent openings in the housing of the cassette which permit the aperture plates of a camera and a projector to be alternatively positioned in operative relationship with the pressure plate and, further, which permit light rays from the projector's light source to be introduced into the cassette. The light rays which enter the light-reflecting element are reflected by that element outwardly of the cassette for projection purposes through the aperture in the pressure plate and the section of filmstrip disposed across the pressure plate. Shoulders extending inwardly of the cassette from the pressure plate are provided with slots to receive projections extending from the cassette's housing to facilitate the mounting of the pressure plate assembly in the cassette. The leaf spring of the pressure plate assembly engages a boss of the cassette's housing to continually urge the pressure plate forwardly within the cassette housing.

A strip of unexposed photographic material is initially coiled around a supply spool and has a leader connected to a coplanarly mounted takeup spool. These spools are adapted to be selectively driven by externally mounted drive means to facilitate reversible transport of the strip of photographic material within the cassette across the pressure plate. The cassette also includes a processing station for treating the strip of photographic material, after it has been exposed to image-carrying light rays with processing fluid to produce visible images thereon from the latent images recorded thereon during the exposure operations.

The cassette with its strip of photographic material in an unexposed condition is first mounted in a camera to facilitate exposure operations. During this sequence, the aperture plate and intermittent film advancement mechanism of the camera are positioned in operative relationship with the cassette's pressure plate and the film is advanced from the cassette's supply spool to its takeup spool. When the exposure operations have been completed, the cassette is removed from the camera and inserted into a processor-projector unit. In this unit the film is first returned from the takeup spool to the supply spool to facilitate processing operations. After processing has been completed, i.e., after suitable visible images have been formed on the strip of photographic material from the latent images recorded thereon during exposure operations, the aperture plate and intermittent film advancement mechanism of the projector are positioned in operative relationship with the cassette's pressure plate and the projector's light source is energized. The visible images on the strip of photographic material are thus projected for viewing purposes as the photographic material is once again progressively advanced from the supply spool to the takeup spool across the pressure plate.

DESCRIPTION OF THE PREFERRED EMBODIMENT

A preferred embodiment of this invention is illustrated as applying a compatible processing fluid to a film structure which comprises both a photosensitive image-recording layer and an image-receiving layer in which a visible image may be formed by image-forming substances transferred by diffusion from the photosensitive layer without necessitating the subsequent removal of the processed photosensitive layer. This highly desirable type of film structure is made possible by a developed negative image having low covering power.

In typical silver halide diffusion transfer reversal processes for the production of black-and-white images, a silver halide developer and a silver halide solvent are applied in an aqueous alkaline solution to a photoexposed silver halide stratum or emulsion where they develop exposed silver halide to silver and react with unreduced silver halide to form a soluble silver complex. This complex, in order to form a positive print, is transferred and reduced to silver on a silver-receptive stratum upon which the silver halide stratum has been superimposed. It has generally been the practice, in the completion of this process, to separate the silver-receptive and silver halide strata in order to render the positive image visible, particularly when it is to be viewed in transmitted light.

However, as indicated above, the positive print may be rendered visible without separation of the silver halide and silver-receptive strata. For example, the silver-receptive stratum may be so constituted as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive images in superposition provide a composite that presents a good image for projection purposes as long as the images are carried on a light-transmitting support. Since the silver halide stratum and the silver-receptive stratum need not be separated, a simplification of the overall silver halide diffusion transfer-reversal process is achieved.

A composite film assembly of this type as well as processing compositions for producing a stable black-and-white image which can be viewed by transmitted light without the necessity of removing the processed, negative image containing photosensitive layer are shown in prior U.S. Pat. No. 2,861,885 of Edwin H. Land which issued on Nov. 25, 1958.

Other composite film assemblies capable of producing photographic records which can be exhibited in full color without the necessity of removing the processed photosensitive layer are shown in prior patents of Edwin H. Land U.S. Pat. Nos. 2,726,154 issued Dec. 6, 1955 and 2,944,894 issued July 12, 1960. All of these prior patents are assigned to the assignee of the present invention.

However, it should be noted that the present invention is not directed to the chemistry by which visible images are formed in an exposed photosensitive material and/or formed in an image-receiving stratum associated therewith. While an illustrated preferred embodiment of the invention is shown applying a compatible processing fluid to a film structure not requiring the removal of the photosensitive layer after visible image formation is completed, the invention itself is also applicable for use with other types of processing fluids and film structures.

Figure 6:
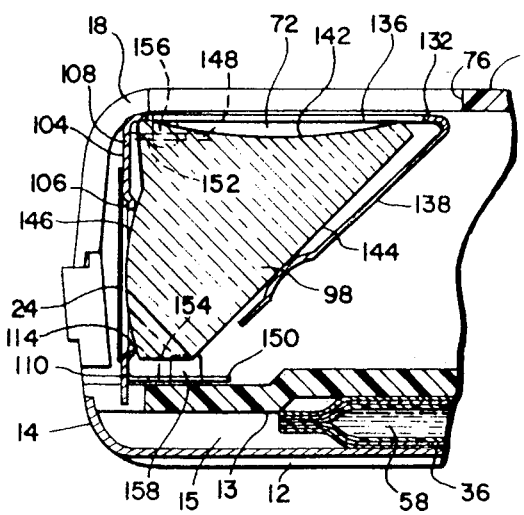
FIG. 6 is a diagrammatic partial vertical sectional view illustrating details of the pressure plate assembly employed in the cassette shown in FIG. 1 taken along line 6—6 of FIG. 1.

The illustrated preferred embodiment of this invention may best be understood by referring first to FIGS. 1, 4 and 6 of the drawings. As may be seen therein, a compact multipurpose film-handling cassette 10 is basically constituted by a pair of housing members 11 and 12 connected together to form an enclosed opaque housing. The housing member 12 is provided with a recessed portion 13 and a removable cover plate 14 which in combination define an enclosed section 15 separated from a main section 17 of the cassette 10.

Cutout portions of the housing members 11 and 12 define an opening 18 through which image-carrying light rays may enter and/or leave the cassette 10 and, further, through which an aperture plate of a camera or of a projector may be introduced into the cassette. In this embodiment, the cassette 10 is relatively flat and generally rectangular parallelepiped in configuration. A supply spool 20 and a takeup spool 22 are coplanarly mounted within section 17 of the cassette 10 for rotation about parallel axes. A strip of unexposed photographic material 24, of the type previously discussed and provided with leaders affixed to the supply spool 20 and to the takeup spool 22, is initially substantially entirely coiled around the supply spool. In passing from the supply spool 20 to the takeup spool 22, the strip of photographic material 24 sequentially travels around idlers 26, 28, 30, 32 and 34. Advantageously, the idlers 30 and 32 are positioned in opposite corners or extremities of the cassette 10 on the same side of the supply spool 20 and the takeup spool 22. Additionally, the idler 28 is advantageously positioned in the corner of the cassette 10 disposed on the other side of the supply spool 20 from the takeup spool 22 and on the opposite side of those spools from the idlers 30 and 32.

A rupturable pod 36 is positioned in the section 15 of the cassette 10 adjacent the frame member 12. This pod 36 includes a weakened seal 38 connected to a fluid-feeding device 40 provided with an exit orifice 42. This orifice 42 in turn communicates through an opening 44 in the housing member 12 with a fluid reservoir chamber 46 of a dispensing container 48. This dispensing container 48 also includes an applicator 50 having a doctor blade 52, an orifice 54 communicating with the reservoir chamber 46 and a U-shaped extension 56 adapted to position the strip of photographic material 24 a carefully predetermined distance from the doctor blade. The rupturable pod 36 initially contains a quantity of processing fluid 58 suitable to form visible images from images recorded on the filmstrip 24 during exposure operations and the assembly comprising the pod 36 and fluid-feeding device 40 is preferably attached by suitable means to the housing member 12 within the cassette's enclosed section 15. This particular type of processing system is the subject of the present inventor's copending application Ser. No. 813,469 filed Apr. 4, 1969. It should be noted that, in the preferred embodiment, the capacity of the reservoir chamber 46 of the dispensing container 48 is equivalent to or greater than that of the rupturable pod 36. For instance, it has been found that approximately 2 cc. of processing fluid is sufficient to treat 50 feet of Super 8 format film. Under such conditions, the pod 36 would have a capacity of 2 cc. and the capacity of the dispensing container's reservoir chamber 46 should be on the order of 2 to 2½ cc.

It will be appreciated that once the plate 14 has been removed from the housing member 12 an exteriorly mounted force-applying member may be drawn across the length of the pod 36 towards its weakened seal 38 and across the fluid-feeding device 40 to initially rupture that seal and to cause the fluid to be expelled from the pod through the fluid-feeding device into the reservoir chamber 46. Also, as may be seen in FIG. 1, a support plate 60 is spring mounted from the housing member 11 on the opposite side of the filmstrip 24 from, and in alignment with, the applicator 50. An aperture 62 provided in the housing member 11 adjacent the support plate 60 permits an externally mounted member to be introduced into the cassette 10 to displace the support plate 60 into contact with the filmstrip 24 and to slidably engage the filmstrip against the applicator 50. Once the filmstrip 24 has been seated against the applicator 50 and the processing fluid 58 expelled from the pod 36 into the reservoir chamber 46, transport the filmstrip in a direction from the takeup spool 22 to the supply spool 20 will cause the filmstrip to draw processing fluid from the applicator to form a fluid coating therealong.

Mounted between the housing member 12 and a wall 64 of the housing member 11 is a light-sealing arcuate member 66, one end of which is positioned against the dispensing container 48. The other end of the member 66 is connected to one end of a second light-sealing arcuate member 68 which extends to within the vicinity of the idler 32. These arcuate members 66 and 68, in combination with the dispensing container 48, serve to effectively divide the section 17 of the cassette 10 into a first compartment 70 sealed in a lighttight manner from a second compartment 72. Additionally, it will be noted that in the preferred embodiment the light-sealing arcuate member 66 and a wall 74 of the dispensing container 48 constitute arcs having a common axis which is that of the supply spool 20. Thus, the arcuate member 66 and the wall 74 further serve to control the disposition of that portion of the filmstrip 24 coiled around the spool 20 within the cassette 10. Similarly, the light-sealing member 68 constitutes an arc, the axis of which is also that of the takeup spool 22, and, consequently, the arcuate member 68 serves to control the disposition of that portion of the filmstrip 24 coiled around the takeup spool 22 within the cassette 10.

It should be also noted at this point that the wall 64 of the cassette 10 is provided with an opening 76 communicating with the aforementioned opening 18 of the cassette 10. As will subsequently become more apparent, this opening 76 permits light rays from an external light source to be introduced into the cassette 10 for projection purposes.

Referring to FIG. 1 of the drawings, it will be seen that a resilient member 78 is connected to the inside face of the wall 64 by any suitable means, such as rivets 80, and extends over and in spaced relationship to the end surfaces 82 and 84 of the idlers 32 and 34, respectively. Provided in the wall 64 is an aperture 86 disposed over the resilient member 78 whereby an external force-applying member may be introduced into the cassette 10 to urge the resilient member's end portions 88 and 90 into frictional engagement with the idlers 32 and 34, respectively, to restrain further rotational movement of those idlers. In order to effectively lightseal the interior of the cassette 10, a ring 92 mounted on the resilient member 78 is coaxially disposed with respect to the aperture 86 and adapted to seat in an annular recess 94 of the wall 64.

Mounted within compartment 72 of the cassette 10 so as to be in alignment with the opening 18 is a pressure plate assembly 96 in which is mounted a light-reflecting element 98. It will be noted that this light-reflecting element 98 is disposed in operable relationship to both the opening 18 and the opening 76 of the cassette 10. The nature of this unique pressure plate assembly 96, the functions which it performs within the cassette 10 and the means by which it is mounted within the cassette will subsequently be described in considerable detail hereinafter.

The spools 20 and 22 are respectively provided with fluted recesses 100 and 102 which are adapted to receive externally mounted drive means through apertures (not shown) appropriately provided through the cassette's wall 64. Thus, the cassette 10 includes means for reversibly transporting the strip of photographic material 24 between the supply spool 20 and the takeup spool 22 and across the applicator 50 and the pressure plate assembly 96.

The nature of the pressure plate assembly 96 is clearly depicted in FIGS. 2 and 3 of the drawings. It will be recognized that most advantageously this assembly 96, in its preferred embodiment, may be formed of an integral piece of sheet metal, such as stainless steel, chromium-plated steel or a beryllium copper alloy. As such it can be produced in low-cost, high-volume manufacturing operations. As shown in the drawings, the pressure plate 104 itself comprises an elongated recessed portion 106 disposed between a pair of raised-edge portions 108 and 110. Provided through the uppermost raised edge portion 108 is an elongated slot 112, while a rectangular aperture 114 is positioned through a section of the elongated recessed portion 106. Formed as part of an extension 116 of the raised edge portion 108 is a leaf spring 118. This extension 116 makes a double right-angle turn with respect to the pressure plate 104 so that the leaf spring 118 is positioned behind the pressure plate and extends from the extension 116 in a direction away from the pressure plate.

The raised-edge portion 108 and extension 116 are provided with a cutout portion 120, while the raised edge portion 108 is also provided with another cutout portion 122. It will also be noted that a pair of tabs 124 and 126 extend from the lower raised-edge portion 110. Retaining members 128 and 130 extend rearwardly from the pressure plate's recessed portion 106 on opposite sides of the aperture 114. Also extending rearwardly of the pressure plate 104 is a mounting bracket 132 comprising a support plate 134, having a circular aperture 136 provided therethrough, and a support arm 138 extending inwardly toward the pressure plate from the end 140 of the plate 134. As shown in FIGS. 4 and 6 of the drawings, a prismatic light-reflecting element 98 is adapted to be mounted firmly against the pressure plate 104 by the retaining members 128 and 130 and the mounting bracket 132. In this respect the arm 138 of the mounting bracket 132 is stressed to press firmly against the light-reflecting element 98.

As indicated, in the preferred embodiment of the invention, the light-reflecting element 98 is prismatic in nature. It includes a concave light-receiving transparent face 142 and a flat reflecting surface 144 which reflects light received into the element through the mounting bracket's circular aperture 136 and the element's light-receiving face 142 outwardly of the light-reflecting element through a convex transparent face 146. After leaving the light-reflecting element 98, these rays pass through the pressure plate's rectangular aperture 114 and that portion of the filmstrip 24 disposed thereover and the cassette's opening 18. A prismatic element of this type suitable for use in connection with the present invention is described in copending application Ser. No. 767,609 of Herbert A. Bing filed Oct. 15, 1968 and assigned to the assignee of the present invention. Thus, the cassette's opening 18 constitutes a film gate adapted to serve as an exposure station during a first pass of the photosensitive filmstrip 24 across the pressure plate 104 and as a projection station during subsequent operations in which the filmstrip, in a fully processed condition, is advanced from the supply spool 20 to the takeup spool 22.

Idler 30, around which the filmstrip 24 passes on the way from the supply spool 20 to the pressure plate 104 may, if desired, be mounted on a movable post spring biased toward the corner which it occupies in the housing of the cassette 10 and capable of being moved resiliently inward away from that corner. Also, idler 32 may be spring biased toward the corner which it occupies of the housing of the cassette 10 and capable of being moved resiliently inward away from that corner. This represents one way to minimize strain exerted on the filmstrip 24 by the conventional intermittent film advancement structure during these exposure and projection operations.

As best seen in FIGS. 2 and 3 of the drawings, a pair of shoulders 148 and 150 respectively extend rearwardly from the pressure plate's raised edge portions 108 and 110. Respectively provided through the shoulders 148 and 150 are a pair of elongated slots 152 and 154 which facilitate the mounting of the pressure plate assembly 96 in the cassette 10 in a manner to be described.

At the time the housing member 11 is assembled to the housing member 12, the elongated slots 152 and 154 of the pressure plate assembly's shoulders 148 and 150 respectively receive rectangular projections 156 and 158 formed integrally with the members 11 and 12 (see FIGS. 2 and 6). Since the height of the pressure plate assembly 96 is slightly less than the distance between the inside faces of the housing members 11 and 12, this assembly initially "floats," i.e., is free to move a limited amount, between the housing members on the rectangular projections 156 and 158. Additionally, it will be noted that, while the rectangular projections 156 and 158 are of substantially the same length as the elongated slots 152 and 154, their width is somewhat less than the width of those slots. Consequently, the rectangular projections 156 and 158 effectively prevent movement of the pressure plate assembly 96 within the cassette 10 in a direction toward or away from either the idler 30 or idler 32, but permit a limited amount of movement of the pressure plate assembly in a direction towards and away from the cassette's opening 18.

Also at the time the pressure plate assembly 96 and the housing members 11 and 12 are assembled, the pressure plate's leaf spring 118 is seated against a boss 160 formed integrally with the housing member 12 and extending inwardly of the cassette 10. Thus, the force of this spring 118 continually urges the pressure plate assembly 96 in a direction toward the cassette's opening 18 (see FIGS. 1 and 6). As shown in FIG. 6, movement of the pressure plate assembly 96 in a direction toward the opening 18 under the force of the leaf spring 118 is initially restrained by the rear edges of the slots 152 and 154 engaging the projections 156 and 158, respectively. It will also be noted that when the pressure plate assembly 96 is thus seated against the projections 156 and 158, the section of the filmstrip 24 intermediate the idlers 30 and 32 and disposed along the pressure plate 104 has its respective edge surfaces bearing against the pressure plate's raised edge portions 108 and 110. In the embodiment illustrated, the photosensitive surface of the filmstrip 24 faces inwardly of the cassette 10 such that exposure of the photosensitive emulsion is effected through the transparent film base.

It will be appreciated that the housing members 11 and 12, as well as various elements associated therewith, e.g., the light-sealing members 66 and 68, the projections 156 and 158 and the boss 160, may, for example, be formed from a suitable thermoplastic resin, such as an acrylic or a polystyrene, in inexpensive injection-molding processes. Similarly, the dispensing container 48 and the removable cover plate 14 may be formed by injection-molding processes employing the same type of material.

As previously mentioned, the cassette 10 is initially furnished with substantially all of the filmstrip 24 in a photosensitive condition coiled on the supply spool 20. For exposure purposes, the cassette 10 is mounted in an appropriate camera (not shown) with the drive means of the camera engaging the recess 102 of the takeup spool 22. While the particular camera employed does not form part of the present invention, it may advantageously take the form of the camera described in the hereinbefore-mentioned application Ser. No. 813,427 of Rogers B. Downey, filed Apr. 4, 1969. The camera described in that application includes a door-mounted pin which automatically enters the cassette 10 through its aperture 86 to snub the idlers 32 and 34 whenever the cassette is mounted therein. In any case, means should be included to snub these idlers 32 and 34 during exposure operations. Additionally, when the cassette 10 is mounted in the camera, an aperture plate and an intermittent film advancement mechanism, which may take a conventional form, of the camera, are positioned through the cassette's opening 18 into operable relationship to the pressure plate 104. This condition is diagrammatically illustrated in FIGS. 4, 5 and 7 of the drawings. Light rays from the scene being photographed are focused by the camera lens through the camera aperture plate and the cassette's opening 18 onto the photosensitive filmstrip 24 in the passage from the supply spool 20 to the takeup spool 22.

As shown in the above-mentioned drawings, a plurality of prongs 162, 164, 166 and 168 extending from the front face of the camera's aperture plate 170 pass across the cassette's pressure plate 104. The spacing between the prongs 162 and 164 and between the prongs 166 and 168 is substantially equivalent to the width of those sections of the pressure plate 104 disposed therebetween. Also, this spacing between the prongs 162 and 164 and between the prongs 166 and 168 is substantially equivalent to the width of the filmstrip 24. Thus, once the camera's aperture plate 170 has been positioned in operable relationship to the pressure plate 104, its prongs 162, 164, 166 and 168 serve to fixedly position the pressure plate assembly 96 between the cassette's housing members 11 and 12 and to fixedly position the filmstrip 24 laterally with respect to the pressure plate 104. It will be recalled that the pressure plate assembly 96 is restrained from movement in its lengthwise direction within the cassette 10 by the rectangular projections 156 and 158 engaging the shoulders 148 and 150 within the slots 152 and 154, respectively.

Further, a pair of pins 172 and 174 extend from the front face of the camera's aperture plate 170 so as to engage the pressure plate's raised edge portion 108. Another pin 176 extends in a similar manner from the camera's aperture plate 170 to engage the pressure plate's tab 126. These pins 172, 174 and 176 are of a carefully predetermined length so as to displace the pressure plate assembly 96 inwardly of the cassette against the force of the leaf spring 118 whereby the section of the filmstrip 24 disposed along the pressure plate 104 is positioned at the proper focal plane for exposure purposes and is disposed in spaced relationship to both the aperture plate 170 and the pressure 104 (see FIG. 7).

During the exposure sequence, the camera's motor simultaneously drives the cassette's takeup spool 22 through a conventional friction-clutching arrangement and the camera's intermittent film advancement mechanism which may typically include a claw 178 (see FIGS. 4 and 5), to properly advance the strip of photosensitive material 24 across the pressure plate 104 in front of the camera's aperture plate 170. It will be noted that the filmstrip 24 is provided with perforations 180 in the conventional manner and, further, that these perforations are aligned with the pressure plate's elongated slot 112. Thus, the claw 178 is free to pass through the filmstrip's perforations 180 into the slot 112 to facilitate step advancement of the filmstrip between the pressure plate 104 and the aperture plate 170. Since the filmstrip 24 passes from the supply spool 20 to the takeup spool 22 free from contact with the camera's aperture plate 170 and the cassette's pressure plate 104, the exposure operations may be performed with a relatively small amount of power being furnished by the camera. At this time, the processing fluid is retained within the rupturable pod 36 and the filmstrip 24 passes between and in spaced relationship to the support plate 60 and the applicator 50, thereby rendering the applicator inoperative.

After the camera's aperture plate 170 has been withdrawn from contact with the cassette's pressure plate 96, as by removing the cassette 10 from the camera, the force of the leaf spring 118 will once again urge the pressure plate assembly 96 into its position illustrated in FIG. 6 of the drawings.

While the exposed filmstrip 24 may be processed with the cassette 10 mounted in a special camera or mounted in a special processing apparatus, it is preferably processed with the cassette mounted in a unit adapted to perform both film-processing and projection operations. The particular processor-projector unit (S) used in conjunction with the cassette 10, does not form part of the present invention; however, it may advantageously take the form of the processor-projector unit described in aforementioned copending application Ser. No. 813,427. In any event, the cassette's cover plate 14 should be removed to expose the rupturable process fluid containing pod 36 and the fluid-feeding device 40 connected thereto prior to insertion of the cassette 10 into that unit. This plate 14 serves to protect the rupturable pod 36 and fluid-feeding device 40 prior to the film-processing operation.

The processor-projector unit includes means for displacing the strip of photographic material 24 from its position shown in FIG. 1, where it is disposed in spaced-apart relationship to the applicator 50, into operative relationship with the applicator. For instance, this arrangement can be effected with a pin displaceably mounted within the processor-projector unit adapted to be selectively introduced into the cassette 10 through the cassette's aperture 62 to bear against the support plate 60 so that the support plate slidably engages the filmstrip 24 against the applicator 50. It should be noted that the cassette's processing fluid storage and applicator system does not form part of the present invention and may very well take a form other than that disclosed in the embodiment illustrated in the drawings.

The processor-projector (not shown) preferably includes a force-applying member adapted to be displaced across the pod 36 and the fluid-feeding device 40 after the cassette 10 has been inserted into that unit and the strip of photographic material 24 slidably engaged against the applicator 50 by the support plate 60. During such displacement of the aforementioned force-applying member, that member presses against the pod 36 and the fluid-feeding device 40 to first rupture the pod's weakened seal 38 and to then cause the processing fluid 58 initially stored therein to be expelled therefrom through the fluid-feeding device into the fluid reservoir chamber of the dispensing container 48. Also, when the cassette 10 has been fully inserted into the processor-projector unit, drive shafts of that unit engage the fluted recesses 100 and 102 of the cassette's supply spool 20 and takeup spool 22, respectively. These shafts are connected in a conventional manner to a motor of the processor-projector unit in order to facilitate selective reversible transport the filmstrip 24 between the supply spool 20 and the takeup spool 22. As is conventional, the drive shaft engaging the takeup spool 22 is connected to the motor through a friction-clutching arrangement.

The processor-projector unit should also contain another pin which may be selectively introduced into the cassette 10 through the aperture 86 in the wall 64 to effect a snubbing of the idlers 32 and 34 during projection operations.

After the cassette 10 has been inserted into the processor-projector unit, the strip of exposed photographic material seated against the applicator 50 and the processing fluid 58 expelled from the pod 36 into the reservoir chamber 46, the processor-projector unit's motor may be energized to return the filmstrip from the takeup spool 22 across the applicator 50 to the supply spool 20. This operation results in the formation of visible images on the filmstrip 24 from the latent images recorded thereon during the exposure sequence. In order to facilitate the flow of processing fluid 58 onto the filmstrip 24, it is preferred that, when the cassette 10 is mounted in the processor-projector unit, the orientation of the cassette be such that the applicator 50 is positioned at the lowermost section of the dispensing container 48, i.e., as shown in FIG. 1.

Figure 8:
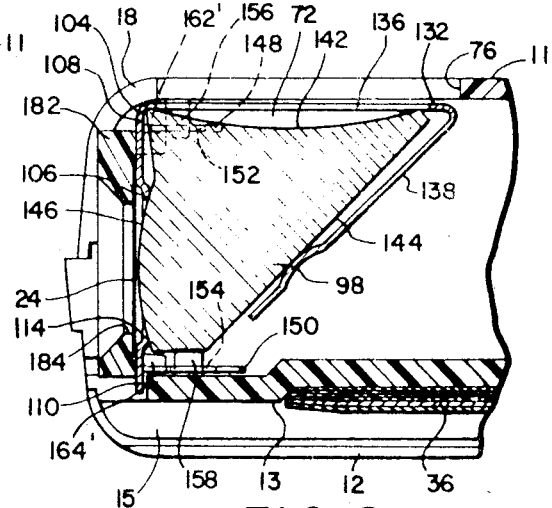
FIG. 8 is a diagrammatic partial vertical sectional view similar to FIG. 6 except illustrating the operative relationship between the pressure plate assembly and the aperture plate of a projector when the cassette is mounted in a projector.

After the exposed filmstrip 24 has been fully processed, the visible images recorded thereon may be appropriately projected for viewing purposes during a subsequent return of the filmstrip from the supply spool 20 to the takeup spool 22. In this connection, an aperture plate 182 and an intermittent film advancement mechanism, which may take a conventional form, of the processor-projector unit are introduced through the cassette's opening 18 into operative relationship with the pressure plate assembly 96. This condition is diagrammatically illustrated in FIG. 8 of the drawings. As shown therein, the projector's aperture plate 182 includes a plurality of forwardly extending prongs 162', 164', 166' and 168' which are substantially identical to the prongs 162, 164, 166 and 168 associated with the camera's aperture plate 170 (see also FIG. 5). These prongs 162', 164', 166' and 168' serve a purpose similar to the prongs associated with the camera's aperture plate 170 in that they fixedly position the pressure plate 104 between the cassette's frame members 11 and 12 and also fixedly position the film strip 24 laterally with respect to the pressure plate.

The projector's aperture plate 182 slidably engages the edge surfaces of the filmstrip 24 against the aperture plate's raised edge portions 108 and 110, respectively. The longitudinal section of the filmstrip 24 on which the visible images are recorded is positioned intermediate the raised-edge portions 108 and 110 of the pressure plate 104 in alignment with both the aperture 184 of the aperture plate 182 and the aperture 114 of the pressure plate 104. Consequently, as the filmstrip 24 is drawn across the pressure plate 104 for projection purposes, its surface associated with the visible images is not contacted by either the pressure plate or the projector's aperture plate 182. It will be seen in FIG. 8 of the drawings that, as the projector's aperture plate 182 slidably engages the filmstrip 24 against the cassette's pressure plate 104, the pressure plate assembly 96 is displaced inwardly of the cassette against the force of the leaf spring 118 to accurately position the film plane for projection purposes.

The film advancement mechanism of the processor-projector unit may typically include a claw similar to the claw 178 associated with the camera (see FIGS. 4 and 5) which intermittently passes through the filmstrip's perforations 180 into the pressure plate's slot 112 to facilitate step advancement of the filmstrip 24 along the pressure plate 104 for projection operations.

The light source 186 of the processor-projector unit is diagrammatically illustrated in FIG. 4 of the drawings. As shown therein, when the cassette 10 is mounted in the processor-projector unit, the light source 186 may be energized to cause light rays emitting therefrom to enter the cassette through its opening 76. It will be recognized that the circular aperture 136 in the support plate 134 permits only those desired and necessary light rays emitting from the light source 186 to contact the reflecting element 98. In this connection, any extraneous light rays from the light source 186 entering the cassette through the opening 76 impinge upon the support plate 134 itself, and are reflected thereby outwardly of the cassette. Thus such extraneous light rays are prevented from creating an undesirable overheated condition within the cassette 10. If desirable, the face of the support plate 134 adapted to intercept and reflect such extraneous light rays may be coated with a material having a high reflectivity characteristic. For instance, if a beryllium-copper alloy is selected for the sheet metal from which the pressure plate assembly 96 is to be formed, this face of the support plate 134 may be coated with a material such as chromium or nickel.

Light rays from the light source 186 entering the light-reflecting element 98 through its concave transparent light-receiving face 142 are redirected by its flat reflecting surface 144 through its concave transparent face 146 and hence outwardly of the cassette into the projector through the pressure plate's aperture 114, the filmstrip 24 and the aperture 184 of the projector's aperture plate 182. Thus image-carrying light rays from the cassette are introduced into the projector which contains conventional means to display such images for viewing purposes.

Prior to removing the cassette 10 from the processor-projector unit, the power supply of that unit should be energized in a manner to effect the return of the filmstrip 24 from the takeup spool 22 to the supply spool 20. Once the cassette 10 has been removed from the processor-projector unit, its plate 14 may be replaced thereon. In this condition, the cassette may be conveniently stored until it is again desired to view the processed filmstrip contained therein. It will be noted that at the time the pressure plate 104 is removed from operative relationship with the projector's aperture plate 182, the force of the spring 118 will automatically return the aperture plate assembly 96 to its position within the cassette 10 as illustrated in FIG. 6.

The term "projector" is used herein in a comprehensive sense, i.e., to broadly refer to those systems wherein the visible images recorded on a sheet of material are reimaged for viewing purposes and is not restricted to only those systems in which the recorded visible images are projected onto a screen of one type or another.

Those familiar with the motion picture arts will readily appreciate the novel and highly unique advantages of this invention. An extremely simple, lightweight, low-cost assembly is provided which is capable of effectively performing a multiplicity of functions and which is particularly well adapted for incorporation into a compact multipurpose motion-picture-film-handling cassette. Advantageously, this assembly may be readily formed of an integral piece of sheet metal. The strip of photographic material 24 is retained in the cassette during exposure, processing and projection operations. Editing of the developed filmstrip 24 can readily be effected by drawing a loop thereof from the cassette's opening 18 and removing sections therefrom or splicing sections thereinto as desired.

This invention may be practiced or embodied in still other ways without departing from the spirit and essential character thereof. The preferred embodiment described herein is therefore illustrative and not restrictive, the scope of the invention being indicated by the appended claims and all variations which come within the meaning of the claims are intended to be embraced therein.

What is claimed is:

1. Apparatus useful for cooperating with an aperture plate and an intermittent film-advancing mechanism of a motion picture projection system, comprising:
    a pressure plate having an aperture provided therethrough and adapted to have a visible image-bearing strip of photographic material slidably seated thereagainst by such aperture plate; and
    means connected to said pressure plate for mounting, aligning and supporting a light-reflecting element on said pressure plate on the opposite side thereof from such strip of photographic material in operative relationship to said aperture, whereby light rays from a light source of such projection system may be redirected by such light-reflecting element through said aperture and such strip of photographic material to facilitate projection operations.

2. The apparatus of claim 1 wherein said pressure plate and said mounting means are formed of an integral piece of sheet metal.

3. The apparatus of claim 1 wherein said mounting means comprises means for mounting a prismatic light-reflecting element.

4. The apparatus of claim 1 wherein said mounting means includes means formed integrally therewith for intercepting extraneous light rays from such light source and for reflecting such extraneous light rays in a direction away from such light-reflecting element.

5. The apparatus of claim 4 wherein said mounting means comprises a piece of sheet metal provided with an aperture therethrough and adapted to be interposed between such light source and such light-reflecting element when such light-reflecting element is mounted in said mounting means.

6. Apparatus useful for cooperating with an aperture plate and an intermittent film-advancing mechanism of a motion picture camera or projection system, comprising:
    a pressure plate adapted to have a strip of photographic material positioned therealong, said pressure plate having an aperture provided therethrough and including means connected thereto for mounting, aligning and supporting a light-reflecting element thereon on the opposite side thereof from such strip of photographic material in operative relationship to said aperture, whereby light rays from a light source of such projection system may be redirected by such light-reflecting element through said aperture and such strip of photographic material to facilitate projection operations; and means adapted to engage an externally mounted member for resiliently urging said pressure plate towards such aperture plate when such aperture plate is disposed in operable relationship to said pressure plate, said pressure plate and said means for resiliently urging said pressure plate towards such aperture plate being formed of an integral piece of sheet metal.

7. The apparatus of claim 6 wherein said pressure plate, and means for resiliently urging said pressure plate towards such aperture plate and said mounting means are formed of an integral piece of sheet metal.

8. Apparatus useful for cooperating with an aperture plate and an intermittent film-advancing mechanism of a motion picture projection system, comprising:

a pressure plate having an aperture provided therethrough and adapted to have a visible image-bearing strip of photographic material slidably engaged thereagainst by such aperture plate;

a light-reflecting element; and means connected to said pressure plate for mounting, aligning and supporting said light-reflecting element on said pressure plate on the opposite side thereof from such strip of photographic material in operative relationship to said aperture, whereby light rays from a light source of such projection system may be redirected by said light-reflecting element through said aperture of said strip of photographic material to facilitate projection operations.

9. The apparatus of claim 8 additionally comprising means connected to said pressure plate for resiliently urging said pressure plate towards such aperture plate when such aperture plate is disposed in operative relationship to said pressure plate.

10. The apparatus of claim 9 wherein said means for resiliently urging said pressure plate towards such aperture plate comprises a leaf spring formed integrally with said pressure plate.

11. Apparatus useful for cooperating with an aperture plate and an intermittent film-advancing mechanism of a motion picture projection system, comprising:

a pressure plate having an aperture provided therethrough and adapted to have a visible image-bearing strip of photographic material slidably engaged thereagainst by such aperture plate;

a light-reflecting element; and means connected to said pressure plate for mounting said light-reflecting element on the opposite side of said pressure plate from such strip of photographic material in operative relationship to said aperture and comprising a piece of sheet metal formed integrally with said mounting means having an aperture provided therethrough and adapted to be interposed between such light source and said light-reflecting element, whereby said certain light rays from such light source will enter said light-reflecting element through said aperture in said piece of sheet metal and such extraneous light rays from such light source will be intercepted and reflected by said piece of sheet metal.

* * * * *